United States Patent
Skaff et al.

(10) Patent No.: US 10,204,280 B2
(45) Date of Patent: Feb. 12, 2019

(54) VEHICLE EXTERIOR LIGHT OUTAGE

(71) Applicant: Ford Global Technologies, LLC, Dearborn, MI (US)

(72) Inventors: Ryan J. Skaff, Farmington Hills, MI (US); Tsung-Han Tsai, Pittsfield Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/611,049

(22) Filed: Jun. 1, 2017

(65) Prior Publication Data

US 2018/0349718 A1 Dec. 6, 2018

(51) Int. Cl.

| | |
|---|---|
| G06K 9/00 | (2006.01) |
| B60Q 11/00 | (2006.01) |
| G06K 9/46 | (2006.01) |
| G06K 9/20 | (2006.01) |
| G06K 9/62 | (2006.01) |
| B60R 11/04 | (2006.01) |
| B60R 11/00 | (2006.01) |
| B60Q 1/04 | (2006.01) |
| B60Q 1/46 | (2006.01) |
| B60Q 1/34 | (2006.01) |
| B60Q 1/44 | (2006.01) |

(52) U.S. Cl.
CPC ........ *G06K 9/00825* (2013.01); *B60Q 11/005* (2013.01); *G06K 9/2054* (2013.01); *G06K 9/4642* (2013.01); *G06K 9/4661* (2013.01); *G06K 9/6215* (2013.01); *B60Q 1/04* (2013.01); *B60Q 1/34* (2013.01); *B60Q 1/44* (2013.01); *B60Q 1/46* (2013.01); *B60R 11/04* (2013.01); *B60R 2011/0026* (2013.01)

(58) Field of Classification Search
USPC ......................................................... 382/104
See application file for complete search history.

(56) References Cited

U.S. PATENT DOCUMENTS

| | | | |
|---|---|---|---|
| 4,647,195 A | 3/1987 | Ishikawa et al. | |
| 8,310,662 B2 | 11/2012 | Mehr et al. | |
| 9,912,876 B1* | 3/2018 | Weber | ........................ B60R 1/00 |
| 2011/0074916 A1* | 3/2011 | Demirdjian | .............. H04N 7/00 |
| | | | 348/36 |
| 2012/0001552 A1 | 1/2012 | Tsai et al. | |

(Continued)

FOREIGN PATENT DOCUMENTS

| | | |
|---|---|---|
| CN | 106314278 A | 1/2017 |
| DE | 102014113985 A1 | 3/2016 |

(Continued)

OTHER PUBLICATIONS

Search Report from United Kingdom Intellectual Property Office dated Oct. 25, 2018 regarding GB Application No. 1808851.8 (5 pages).

*Primary Examiner* — Gregory F Cunningham
(74) *Attorney, Agent, or Firm* — Frank A. MacKenzie; Bejin Bieneman PLC (57) ABSTRACT

A computer includes a processor that is programmed to activate a vehicle exterior light, and measure a luminance in a predetermined region outside the vehicle based on vehicle camera data. The processor is programmed to determine whether the vehicle exterior light is operational based the measured luminance.

20 Claims, 6 Drawing Sheets

(56) References Cited

U.S. PATENT DOCUMENTS

| | | | |
|---|---|---|---|
| 2012/0105637 A1* | 5/2012 | Yousefi et al. | H04N 7/18 348/148 |
| 2013/0286672 A1* | 10/2013 | Godecker | G01M 11/068 362/466 |
| 2016/0350939 A1 | 12/2016 | Cuddihy et al. | |
| 2017/0064221 A1* | 3/2017 | Taylor | H04N 5/332 |
| 2017/0313250 A1* | 11/2017 | Fischer | B60R 1/08 |
| 2018/0063402 A1* | 3/2018 | Weber | H04N 5/2353 |
| 2018/0290583 A1* | 10/2018 | Park | B60Q 1/1423 |

FOREIGN PATENT DOCUMENTS

| | | |
|---|---|---|
| DE | 102015214332 A1 | 2/2017 |
| DE | 102015216920 A1 | 3/2017 |
| EP | 3138731 A1 | 3/2017 |
| WO | 2016020338 A1 | 2/2016 |

* cited by examiner

VEHICLE EXTERIOR LIGHT OUTAGE

BACKGROUND

Vehicles typically have multiple exterior lights such as headlights, turn signals, brake lights, tail lights, etc. A vehicle exterior light may fail to operate, which may impair, e.g., during night time, vehicle driver visibility and/or vehicle sensor operation. To detect other vehicles and/or a vehicle driving lane, a vehicle camera and/or a vehicle driver may need operational exterior lights that illuminate an exterior of the vehicle, e.g., the driving lane. Detecting non-operating exterior lights may be a challenge, e.g., due to cost of diagnostics circuitry, lack of existing mechanism, etc., for exterior light outage detection.

DETAILED DESCRIPTION

Introduction

Disclosed herein is a computer including a processor that is programmed to activate a vehicle exterior light, and measure a luminance in a predetermined region outside the vehicle based on vehicle camera data. The processor is programmed to determine whether the vehicle exterior light is operational based the measured luminance.

The vehicle exterior light may be one of a head light, a turn signal, a hazard light, a parking light and a brake light.

The camera may include a forward camera and a rear camera.

The computer may be further programmed to determine whether the vehicle exterior light is operational only after that a non-vehicle light source is not detected.

The computer may be further programmed to detect the non-vehicle light source in an area around the vehicle based on map data and data received from the camera.

The computer may be further programmed to detect the non-vehicle light source based on a time and weather data.

The exterior light may be one of a vehicle turn signal and a vehicle hazard light, and the processor may be further programmed to determine whether the exterior light flashes with an expected frequency based on the measured luminance.

The computer may be further programmed to determine a histogram of the predetermined region and determine whether the vehicle exterior light is operational based the determined histogram and a reference histogram.

The computer may be further programmed to measure a second luminance in a second predetermined region associated with a second vehicle exterior light, and determine whether the second vehicle exterior light is operational based on the second luminance.

The computer may be further programmed to, upon determining that a difference between the luminance and the second luminance exceeds a predetermined threshold, actuate a vehicle component.

The predetermined region may extend along a front right direction of the vehicle and the second predetermined region may extend along a front left direction of the vehicle.

The predetermined region and the second predetermined region may have no overlap.

Further, disclosed herein is a method comprising activating a vehicle exterior light, measuring a luminance in a predetermined region outside the vehicle based on vehicle camera data, and determining whether the vehicle exterior light is operational based the measured luminance.

The vehicle exterior light may be one of a head light, a turn signal, a hazard light, a parking light and a brake light.

The camera may include a forward camera and a rear camera.

Determining whether the vehicle exterior light is operational may be only performed after that a non-vehicle light source is not detected.

The method may further include detecting the non-vehicle light source in an area around the vehicle based on at least one of map data, data received from the camera, time, and weather data.

The method may further include determining whether the vehicle exterior light flashes with an expected frequency based on the measured luminance.

The method may further include determining a histogram of the predetermined region and determining whether the vehicle exterior light is operational based the determined histogram and a reference histogram.

The method may further include measuring a second luminance in a second predetermined region associated with a second vehicle exterior light, and determining whether the second vehicle exterior light is operational based on the second luminance.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

Exemplary System Elements

Figure 1:
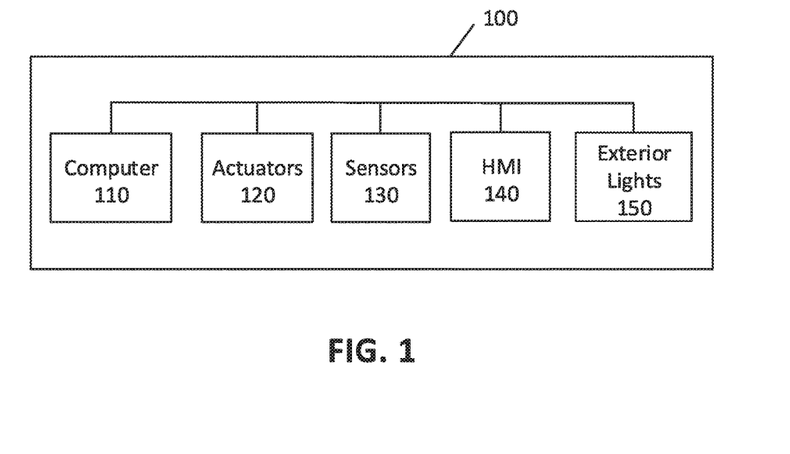
FIG. 1 is a diagram showing an example vehicle system.

FIG. 1 illustrates an example first vehicle 100 including a computer 110, actuators 120, sensors 130, human machine interfaces (HMIs 140), exterior lights 150, and typically one more other components, as discussed herein below. The vehicle 100 may be powered in variety of known ways, e.g., with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle network such as a communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the actuators, the sensors 130, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

Figure 2:
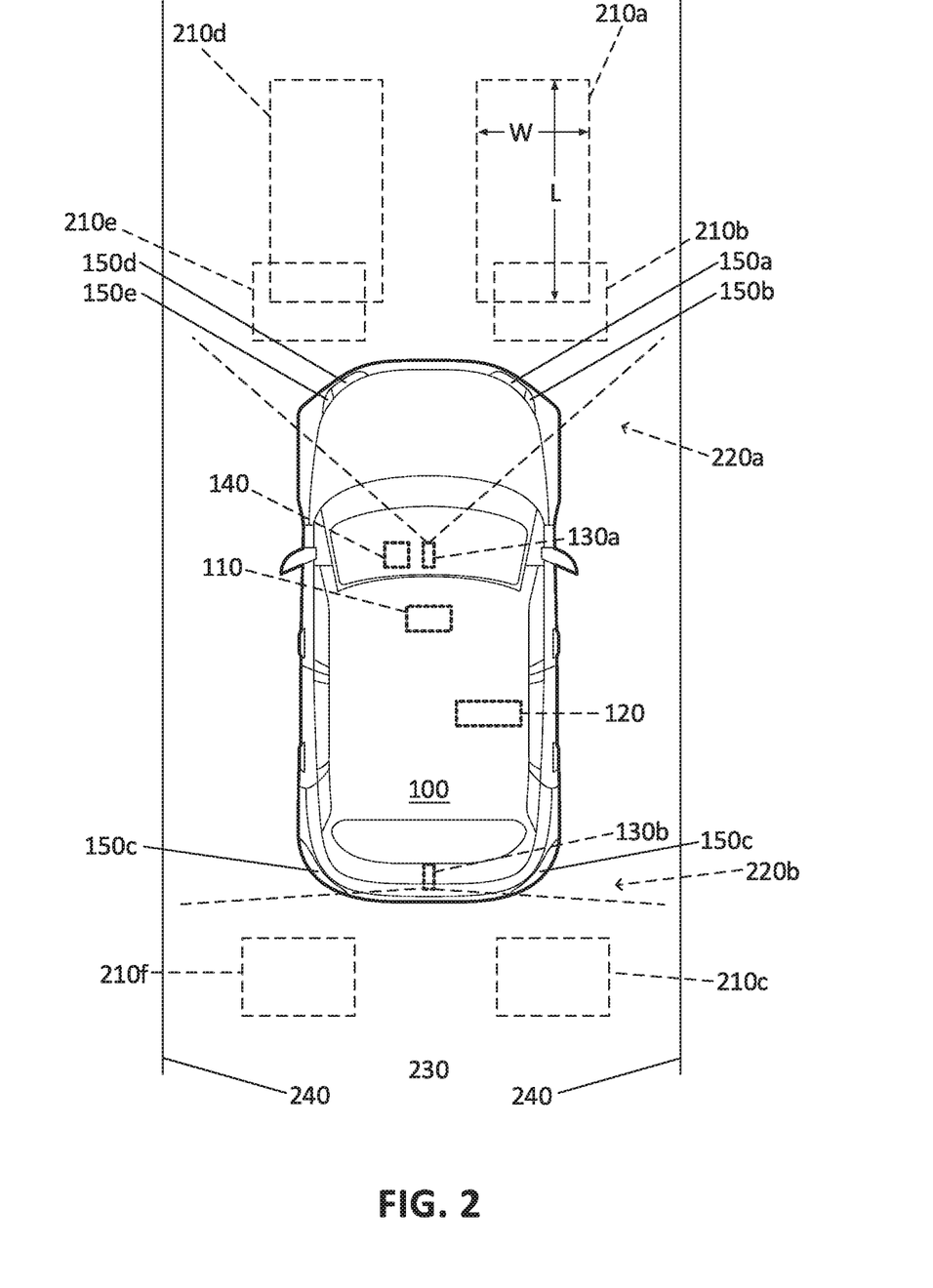
FIG. 2 is a top view of the vehicle of FIG. 1 on a road.

The vehicle 100 may include one or more sensors 130, e.g., camera sensors 130a, 130b (see FIG. 2). A camera sensor 130a, 130b is an electronic vision sensor providing image data of the exterior and/or interior of the vehicle 100, or the like. The sensors 130 may output signals to various components of the vehicle 100, such as the computer 110. In one example, the computer 110 may generate image data, e.g., an image including a visual projection of vehicle 100 surrounding e.g., a road 230, lane markings 240, etc. (see FIG. 2), based on the data received from the camera sensor 130a mounted in a forward direction to, e.g., a vehicle 100 front windshield. The sensors 130 may be mounted in or on various locations in the vehicle 100, e.g., in a front or rear vehicle light enclosure, behind the windshield, in the side view mirror packages, etc. The fields of view 220a, 220b of the sensor(s) 130a, 130b may include an area exterior to the vehicle 100. The camera sensors 130a, 130b may include chips, image sensors, and optical components. The camera sensors 130a, 130b may output image data based on the optical signals captured by the image sensor(s). The computer 110 may be programmed to determine various optical properties of the received image data, e.g., brightness, etc., as discussed below with reference to FIGS. 3-4.

The actuator(s) 120 of the first vehicle 100 are implemented via circuits, chips, or other electronic components that can actuate various vehicle subsystems in accordance with appropriate control signals as is known. The actuators 120 may be used to control braking, acceleration, and steering of the first vehicle 100. As an example, the first vehicle 100 computer 110 may output control instructions to control the actuators 120.

The vehicle 100 includes one or more exterior light(s) 150, e.g., a head light, turn signal, brake light, fog light, hazard light, parking light, etc. The exterior light(s) 150 may be mounted to a front of, a rear of, and/or a side of the vehicle 100 and may be oriented in a forward, rear, and/or side direction extending from the vehicle 100. An exterior light 150 may include various type of light producing components such as Light Emitting Diode (LED), halogen, High Intensity Discharge (HID), etc. An orientation of an exterior light 150 such as a turn signal is typically fixed relative to the vehicle 100 body, whereas an orientation of an exterior light 150 such as a headlight may be adjustable. In one example, the computer 110 can be programmed to adjust an orientation of a vehicle 100 exterior light 150 such as a headlight based on a curvature of a road, etc. The computer 110 may actuate a vehicle 100 electromechanical actuator to adjust the orientation of an exterior light 150. The computer 110 may be programmed to actuate an exterior light 150 such as a turn signal and/or a hazard light 150 to flash.

With reference to FIG. 2, due to various reasons an exterior light 150 may not operate as expected, e.g., a component of the exterior light 150 may be broken, a wiring of the exterior light 150 may be lose and/or disconnected, etc. An exterior light 150 may be partially or fully non-operational. For example, in a partially-operational light 150, some but not all of LEDs may be operational, e.g., the headlight may generate insufficient light for adequate illumination of a road 230.

The computer 110 may be programmed to activate a vehicle 100 exterior light 150, measure a luminance in a predetermined region (e.g. a region 210a, 210b, 210c, 210, d, 210e) outside the vehicle 100 based on vehicle 100 camera sensor 130 data. The computer 110 may be further programmed to determine whether the vehicle 100 exterior light 150 is operational based on the measured luminance. Thus, advantageously, the computer 110 may detect a vehicle 100 exterior light 150 outage and/or partial-operation. The computer 110 may be programmed to actuate a vehicle 100 HMI 140, e.g., a malfunction indicator light (MIL) to turn on upon determining that one or more of the vehicle 100 exterior light(s) 150 are non-operational.

A region such as regions 210a, 210b, 210c, 210, d, 210e, in the context of present disclosure, refers to an exterior area of the vehicle 100 within a predetermined distance, e.g., 50 meters, from the vehicle 100 that is illuminated by a vehicle 100 exterior light 150 when the light 150 is activated. A region 210 may be defined based on a location, orientation, etc. of the respective exterior light 150. A region 210 may be an area located on the road 230 with various shapes such as a trapezoidal, circular, oval, etc. A location of a region 210 is determined relative to the vehicle 100, i.e., the region 210 moves with respect to the road 230 along with the vehicle 100. A shape and/or dimensions of a region 210 may further depend on a slope of the road 230 and/or slope of the vehicle 100 relative to the road 230. For example, the region 210a may have a length and width L, W when the vehicle 100 stands and/or drives on a road 230 with a flat surface (see FIG. 2).

A region 210a may extend along a front right direction of the vehicle 100 and a region 210e may extend along a front left direction of the vehicle 100. In one example, the region 210a is associated with a front headlight 150. The region 210a may be a portion of an area that is typically illuminated when the front right headlight 150 is activated. Additionally or alternatively, the regions 210d, 210b, 210e may be associated with the front left headlight 150, front right turn signal, and front left turn signal, respectively. Additionally or alternatively, the regions 210c, 210f may be associated with the right and left brake lights 150, respectively. The predetermined regions may overlap one another, e.g., the regions 210a, 210b. Alternatively, the predetermined regions may lack an overlap, e.g., the regions 210a, 210d.

Additionally or alternatively, a region may move relative to the vehicle 100 and/or change shape based on a change of an orientation of a vehicle 100 exterior light 150. For example, the computer 110 may be programmed to actuate a vehicle 100 actuator 120 to change an orientation of a front headlight based on road 230 curvature. Thus, the computer 110 may be further programmed to adjust a location and/or shape of a region associated with the moving headlight based on a change of the orientation of the headlight.

Luminance, in the context of present disclosure, refers to an amount of light per second that is emitted from a region. The luminance may be measured in a unit of a lumen. The detected luminance of a region may be a result of illuminating the respective region by a vehicle 100 exterior light 150, e.g., a front right headlight 150 illuminating the region 210a. As discussed below, detected luminance may additionally or alternatively be a result of a light source outside the vehicle 100 such as another vehicle, sunlight, etc.

Figure 3:
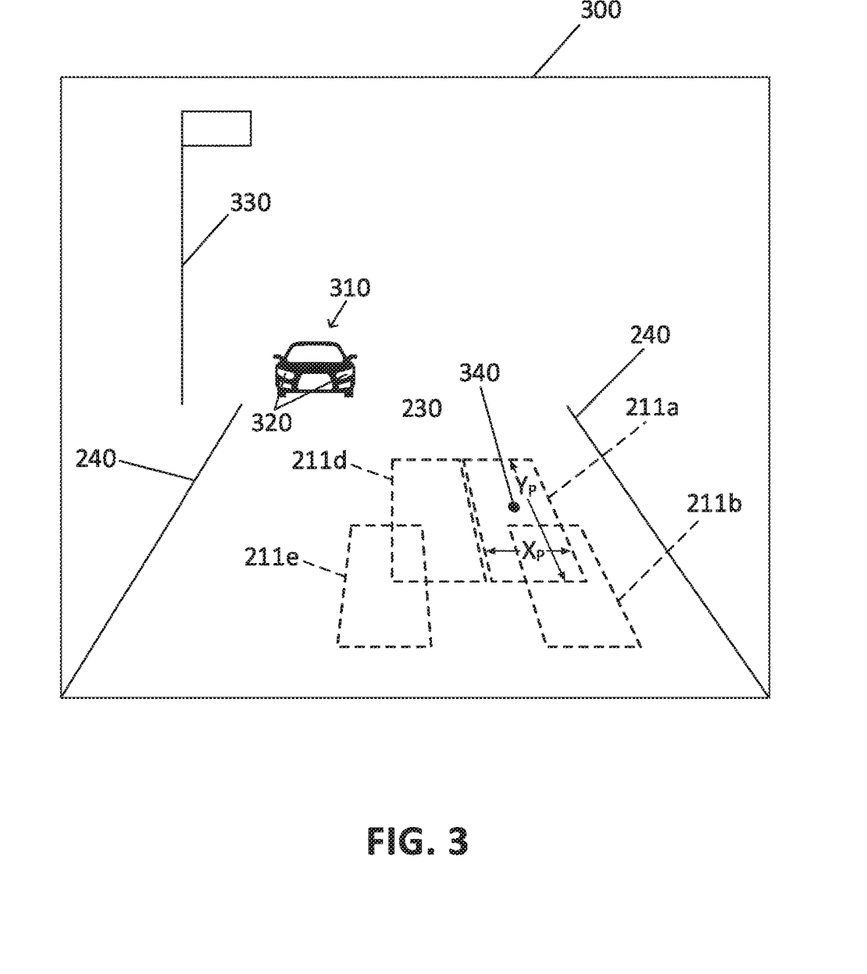
FIG. 3 illustrates an example image captured by a camera in the vehicle, including the road and the regions in front of the vehicle.

With reference to FIGS. 2-3, the computer 110 may be programmed to receive an image 300 including a field of view 220a of the camera sensor 130a. The computer 110 may be further programmed to identify a projected region 211a in the received image 300. In other words, the computer 110 may identify a region 211a in the image that corresponds to the region 210a on the road 230. The computer 110 may be programmed to determine a projected length Lp and width Wp of the projected region 211a based on the region 210a shape, dimensions L, W, road 230 slope, optical properties of the camera sensor 130a, etc., using known geometrical techniques. The road 230 slope in the present context is defined as a longitudinal and/or lateral slope of the road 230 with respect to a ground surface. The optical properties of a camera sensor 130 may include focal point, image resolution, etc. For example, the computer 110 may be programmed to determine the length L based on the projected length Lp and the optical properties of the camera sensor 130, using known geometrical optics techniques.

A projection of a region 210 may have different shape compared to a shape of the region 210. The computer 110 may be programmed to determine the projection shape for a region based on the region shape, road 230 slope, camera sensor 130 orientation, etc. For example, the computer 110 may determine that a projected region 211a has a trapezoidal shape based on a rectangular shape of the region 210a, vehicle 100 camera sensor 130 orientation, etc. In another example, a projection of a circular region may have an oval shape.

The computer 110 may be programmed to measure the luminance of a region 210 such as the region 210a based on a projection (e.g., the projected region 211a) of the region 210a in the image 300. For example, the computer 110 may be programmed to determine optical properties of the image 300 and measure the luminance of the region 210a based on the determined optical properties of the projected region 211a. The optical properties may include brightness, color tone, etc. For example, a brightness of a projected region in the image 300 may be related to the luminance of the respective region. Thus, the computer 110 may be programmed to determine the luminance of a region 210 based on optical properties of the received image 300. As another example, the vehicle 100 may include multiple camera sensors 130, e.g., a surround-view camera system including 4 or more camera sensors 130. Each of the camera sensor 130 may output data associated with one or more regions 210.

As one example of using an optical property of an image 300, the computer 110 may be programmed to determine the luminance of the region 210a by identifying a brightness of the projected region 211a in the image 300. The computer 110 may be programmed to identify the brightness of the projected region 211a by calculating an average brightness based on a brightness of each of pixels within the projected region 211a. The computer 110 may be programmed to determine the brightness of each pixel based on data received from the camera sensor 130a. For example, the camera sensor 130 image sensor may output a pixel intensity value associated with each pixel in the image 300.

In another example, the computer 110 may be programmed to generate a histogram of the predetermined region 220 and determine whether the vehicle 100 exterior light 150 is operational based the determined histogram and a reference histogram.

Figure 5:
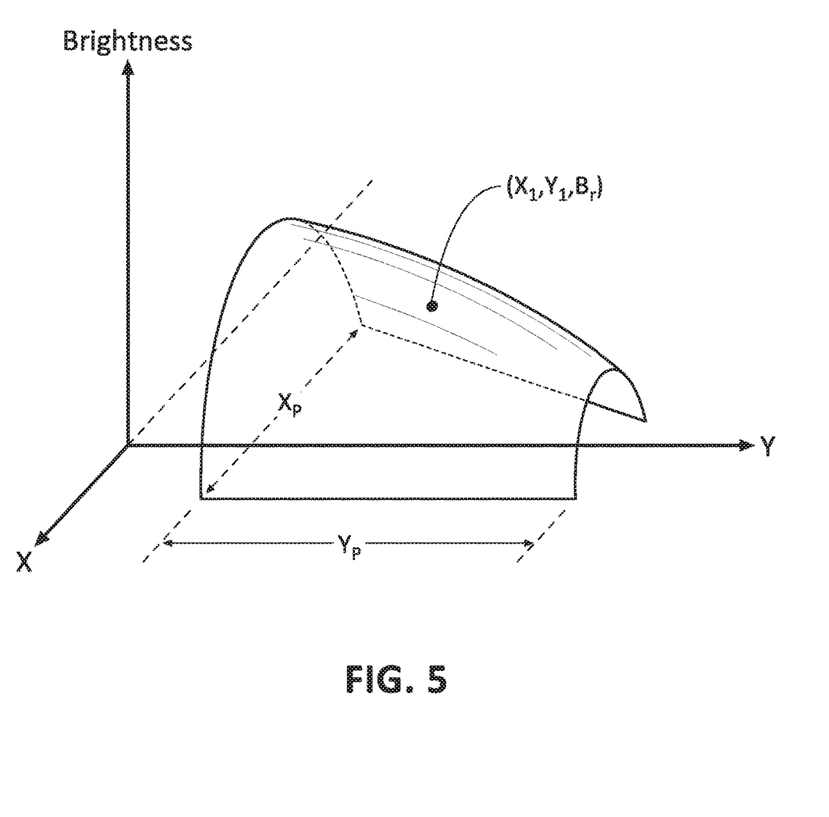
FIG. 5 shows an example three-dimensional histogram graph of brightness in one of the regions around the vehicle.

A histogram, as is conventionally understood, is a graphical representation of distribution of a numerical data such as pixel brightness within a predetermined region such as the region 210a. The computer 110 may be programmed to calculate the histogram of the region 210a based on the received image 300. In one example shown in FIG. 5, a histogram may be represented as a three-dimensional surface. Each point on the histogram surface may represent, e.g., the brightness, etc., of the pixel in the region 210a. For example, a pixel 340 with coordinates $X_1$, $Y_1$ may have a brightness $B_1$. Thus, the histogram surface may include a point $X_1$, $Y_1$, $B_1$. In one example, $X_1$ and $Y_1$ may be the coordinates of the pixel 340 relative to a corner of the projected region 211a.

Figure 4A:
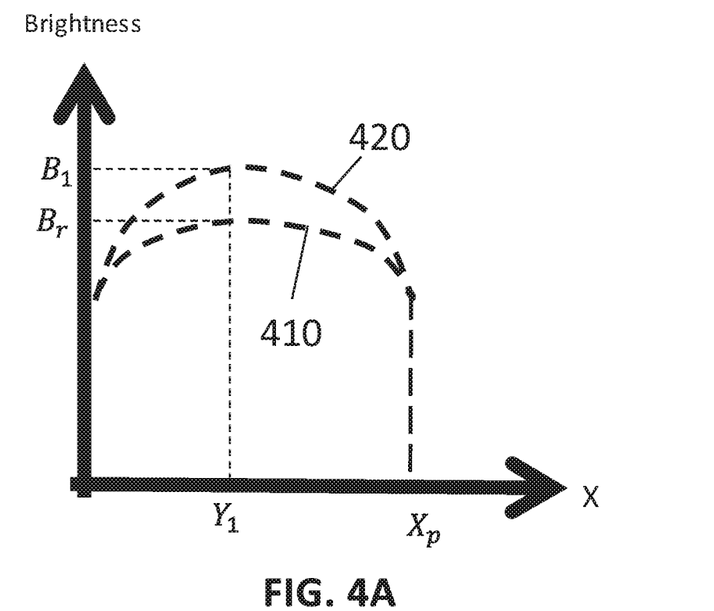
FIGS. 4A-4B show example histogram graphs of brightness in one of the regions around the vehicle.
Figure 4B:
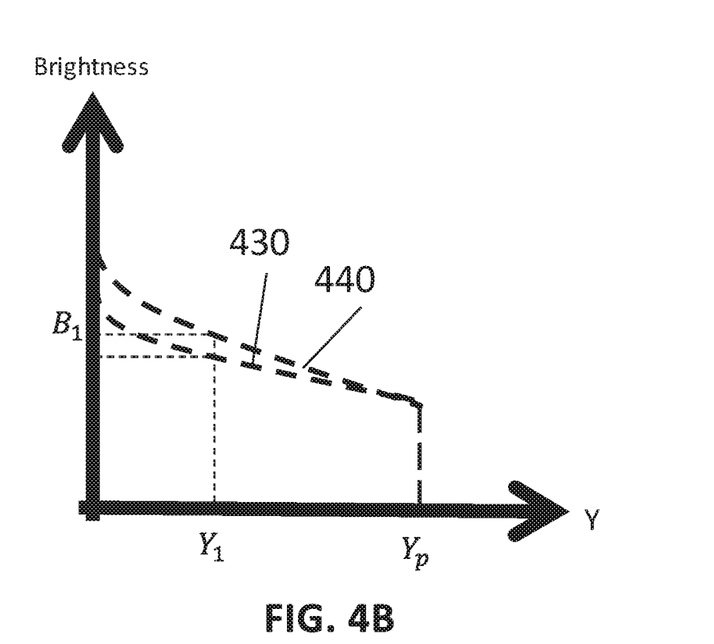

Additionally or alternatively, the histogram may be represented as two-dimensional histogram graphs 420, 440, as shown in FIGS. 4A-4B. For example, based on histogram graph 420 shown in FIG. 4A, a pixel with the lateral coordinate $X_1$ may have a brightness $B_1$. Additionally or alternatively, as shown in the histogram 440 in FIG. 4B, a pixel with a longitudinal coordinate $Y_1$ may have a brightness $B_1$.

The reference histogram may be a predetermined three-dimensional surface or a two-dimensional graph that determines a minimum expected brightness in any location coordinate of a region. For example, the histogram graphs 410, 430 may represent an expected brightness for each location coordinate within the predetermined region 210a. The computer 110 may be programmed to determine that the exterior light 150 is operational upon determining that a brightness of each location coordinate within a predetermined region exceeds an expected brightness associated with the respective location coordinate. For example, the computer 110 may determine that the brightness $B_1$ of pixel 340 exceeds the expected brightness $B_r$. In another example, the computer 110 may be programmed to determine that the exterior light 150 is operational upon determining that at least a predetermined percentage, e.g., 70%, of pixels within the region 210a have a brightness that exceeds the expected brightness.

Additionally or alternatively, the computer 110 may be programmed to classify an operational issue of the light exterior 150 based on the determined histogram, e.g., when the light 150 is partially operational. For example, if the light 150 includes multiple LED component and a specific portion, e.g., a right half, of the predetermined region has a brightness less than the expected brightness, the computer 110 may be programmed to determine which LED in the light 150 is faulty, based on, e.g., a direction and/or intensity of each LED and/or LED strip. In this example, the computer 110 may determine that the LED oriented to the right half of the region is non-operational.

Additionally or alternatively, a histogram may represent a brightness (or intensity) of a specific color tone in a predetermined region. In one example, the computer 110 may be programmed to determine whether an exterior light 150 is operational based on an expected color tone, e.g., orange color of a turn signal light 150, and the determined histogram.

An exterior light, e.g., a turn signal 150, a hazard light 150, etc. may flash. The computer 110 may be programmed to determine whether a vehicle 100 light 150 such as a turn signal is operational by determining whether the vehicle 100 turn signal light 150 and/or hazard light 150 flashes with an expected frequency and/or an expected duty cycle based on the measured luminance. In one example, the computer 110 may receive current actuation status of the turn signal light 150 including an "OFF" state and an "ON" state. The computer 110 may be programmed to determine whether the turn signal light 150 is operational by determining the luminance of the respective region during the "ON" state. Additionally or alternatively, the computer 110 may be programmed to determine the luminance of the region during "ON" and "OFF" state, and determine that the turn signal light 150 is operation by determining that the luminance of the respective region is less than a first threshold during "OFF" state, and is greater than a second threshold during "ON" state.

The computer 110 may be programmed to determine whether each of multiple exterior lights 150, e.g., turn signals, headlights, brake lights, hazard light, parking light, etc., in the vehicle 100 is operational. The computer 110 may be programmed to measure a first and second luminance in a first and second predetermined regions associated with a first and second vehicle 100 exterior lights 150. The computer 110 may be further programmed to determine whether each of the first and second vehicle 100 exterior lights 150 is operational based on the first and second luminance.

A vehicle 100 typically includes exterior lights 150 that operate together and have similar properties, e.g., right and left headlights 150 typically are activated simultaneously and have similar expected light intensities. In one example, a difference between luminance of regions 210a, 210d may indicate an operational deficiency of at least one of the headlights 150. The computer 110 may be programmed to actuate a vehicle 100 component, e.g., an HMI 140, upon determining that a difference between a first luminance (e.g., of the region 210a) and a second luminance (of, e.g., the region 210d) exceeds a predetermined threshold, e.g., 50 lumens. In one example, the computer 110 may actuate a MIL included in the HMI 140.

As discussed above, the computer 110 may determine whether a light 150 is operational based on a luminance of a region 210 associated with the light 150. However, a luminance of the respective region 210 may be caused by not only the exterior light 150 but some other light source such a second vehicle 310 exterior lights 320 (see FIG. 3). Additionally or alternatively, other light sources such as street lights 330, building lights, sun light, etc., may illuminate the predetermined region 210.

The computer 110 may be programmed to determine whether the vehicle 100 exterior light 150 is operational only after that a non-vehicle light source is not detected. In other words, the computer 110 may be programmed to determine whether the light 150 is operational only after determining that a measured luminance of the respective region is only caused by the vehicle 100 lights 150. A non-vehicle light source, in the context of present disclosure, refers to any light source not included in or on the first vehicle 100. Thus, the second vehicle 310 light 320 is considered a non-vehicle light source. The first vehicle 100 computer 110 may be programmed to detect a non-vehicle exterior light source in an area, e.g., within 100 meters, around the vehicle 100 based on map data and/or data received from the vehicle 100 sensors 130 such as the camera sensor 130. In one example, the computer 110 may be programmed to determine whether non-vehicle light sources are present based on map data including location coordinates of traffic lights, street lights, buildings, etc. In another example, the computer 110 may be programmed to detect non-vehicle light sources based on data received from the vehicle 100 sensors 130. Additionally or alternatively, the computer 110 may be programmed to detect a non-vehicle light source based on a time and weather data. For example, the computer 110 may detect sun light as a non-vehicle light source based on time of the day and weather data including cloudy, sunny, etc.

Processing

Figure 6:
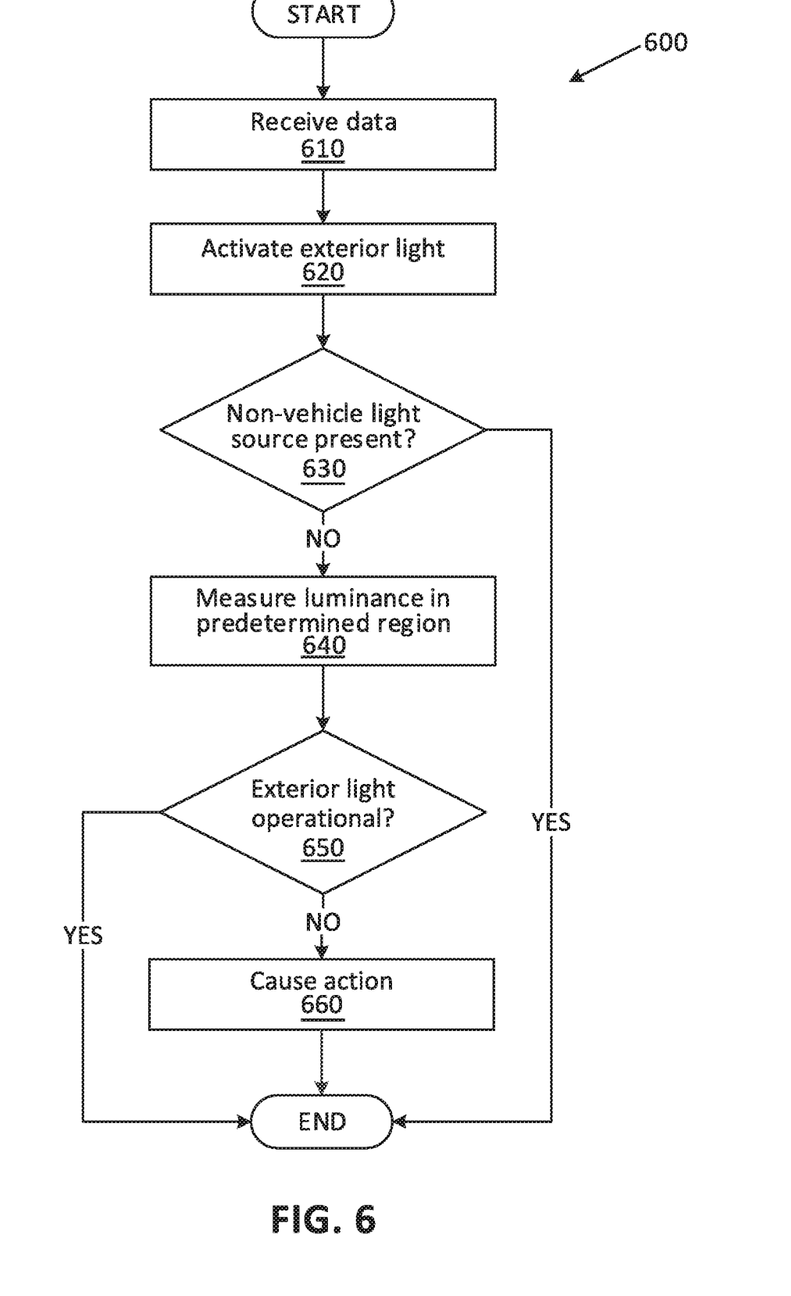
FIG. 6 is a flowchart of an exemplary process for detecting an outage of a vehicle exterior light.

FIG. 6 shows a flowchart of an exemplary process 600 for detecting an outage of a vehicle 100 exterior light 150. The vehicle 100 computer 110 may be programmed to execute blocks of the process 600.

The process 600 begins in a block 610, in which the computer 110 receives data from, e.g., vehicle 100 sensors 130, a remote computer, etc. For example, the computer 110 may be programmed to receive image data from camera sensor 130, time and weather data from a remote computer, location coordinates from a vehicle 100 GPS sensor 130, etc.

Next, in a block 620, the computer 110 activates one or more vehicle 100 exterior light 150 such as headlights, turn signals, etc.

Next, in a decision block 630, the computer 110 determines whether a non-vehicle light source is present, e.g., within the field of view 220a of the front camera 130a. The computer 110 may be programmed to determine whether a non-vehicle light source (i.e., a light source outside the vehicle 100) is present based on image data received from the sensors 130, map data including street lights 330 location etc. received from a remote computer, etc. If the computer 110 determines that a non-vehicle light source is present, then the process 600 ends (or alternatively returns to the block 610, although not shown in FIG. 6); otherwise the process 600 proceeds to a block 640.

In the block 640, the computer 110 measures luminance in one or more predetermined region 210, e.g. a region 210a. The computer 110 may be programmed to measure the luminance of the regions based on optical parameters of a projected region associated to the predetermined region. The computer 110 may be then programmed to measure the luminance of the region by calculating a brightness of the projected region in the image 300, and/or calculate a histogram of the projected region in the image 300.

Next, in a decision block 650, the computer 110 determines whether the exterior light(s) 150 is/are operational. In one example, the computer 110 may be programmed to determine whether the lights 150a, 150b, 150d, 150e are operational upon determining that the measured brightness of the projected regions 211a, 211b, 211d, 211e exceed a brightness threshold, respectively. In another example, the computer 110 may be programmed to determine whether the light 150 is operational based on the calculated histogram and a reference histogram. If the computer 110 determines the exterior light(s) 150 is operational, then the process 600 ends (or alternatively returns to the block 610, although not shown in FIG. 5); otherwise the process 600 proceeds to a block 660.

In the block 660, the computer 110 actuates a vehicle 100 component to cause an action. For example, the computer 110 may actuate a malfunction indication light (MIL) included in the HMI 140 to turn on. Additionally or alternatively, the computer 110 may be programmed to transmit a message including an identifier of a non-operational exterior light 150 to a remote computer, e.g., a service center computer. Following the block 660 the process 600 ends.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor programmed to:
   activate a vehicle exterior light;
   measure a luminance in a region outside the vehicle based on vehicle camera data, wherein the region has a shape defined with respect to the vehicle exterior light and is a predetermined distance from the vehicle; and
   determine whether the vehicle exterior light is operational based on the measured luminance.

2. The computer of claim 1, wherein the vehicle exterior light is one of a head light, a turn signal, a hazard light, a parking light, and a brake light.

3. The computer of claim 1, wherein the vehicle camera data is from a forward camera and a rear camera on the vehicle.

4. The computer of claim 1, further programmed to determine whether the vehicle exterior light is operational only after determining an absence of a non-vehicle light source.

5. The computer of claim 4, further programmed to detect the non-vehicle light source in an area around the vehicle based on map data and data received from the camera.

6. The computer of claim 4, further programmed to detect the non-vehicle light source based on a time and weather data.

7. The computer of claim 1, wherein the exterior light is one of a vehicle turn signal and a vehicle hazard light, and the processor is further programmed to determine whether the exterior light flashes with an expected frequency based on the measured luminance.

8. The computer of claim 1, further programmed to:
   measure a second luminance in a second predetermined region associated with a second vehicle exterior light; and
   determine whether the second vehicle exterior light is operational based on the second luminance.

9. The computer of claim 8, further programmed to, upon determining that a difference between the luminance and the second luminance exceeds a predetermined threshold, actuate a vehicle component.

10. The computer of claim 8, wherein the predetermined region extends along a front right direction of the vehicle and the second predetermined region extends along a front left direction of the vehicle.

11. The computer of claim 8, wherein the predetermined region and the second predetermined region have no overlap.

12. A method, comprising:
    activating a vehicle exterior light;
    measuring a luminance in a region outside the vehicle based on vehicle camera data, wherein the region has a shape defined with respect to the vehicle exterior light and is a predetermined distance from the vehicle; and
    determining whether the vehicle exterior light is operational based on the measured luminance.

13. The method of claim 12, wherein the vehicle exterior light is one of a head light, a turn signal, a hazard light, a parking light, and a brake light.

14. The method of claim 12, wherein the vehicle camera data is from a forward camera and a rear camera on the vehicle.

15. The method of claim 12, wherein determining whether the vehicle exterior light is operational is only performed after determining an absence of a non-vehicle light source.

16. The method of claim 15, further comprising detecting the non-vehicle light source in an area around the vehicle based on at least one of map data, data received from the camera, time, and weather data.

17. The method of claim 12, further comprising determining whether the vehicle exterior light flashes with an expected frequency based on the measured luminance.

18. The method of claim 12, further comprising:
   measuring a second luminance in a second predetermined region associated with a second vehicle exterior light; and
   determining whether the second vehicle exterior light is operational based on the second luminance.

19. A computer, comprising a processor programmed to:
   activate a vehicle exterior light;
   measure a luminance and a histogram in a predetermined region outside the vehicle based on vehicle camera data; and
   determine whether the vehicle exterior light is operational based on the measured luminance and the histogram.

20. The computer of claim 19, wherein the processor is further programmed to determine whether the vehicle exterior light is operational based on the determined histogram and a reference histogram.

* * * * *